Sept. 3, 1946.  E. A. STALKER  2,406,923
AIRCRAFT HAVING BOUNDARY LAYER CONTROLLED WINGS
Filed May 14, 1943  3 Sheets-Sheet 1

INVENTOR
Edward A. Stalker
By Marechal and Biebel
ATTORNEYS

Sept. 3, 1946. E. A. STALKER 2,406,923
AIRCRAFT HAVING BOUNDARY LAYER CONTROLLED WINGS
Filed May 14, 1943 3 Sheets-Sheet 2

INVENTOR
Edward A. Stalker
By Marechal and Riebel
ATTORNEYS

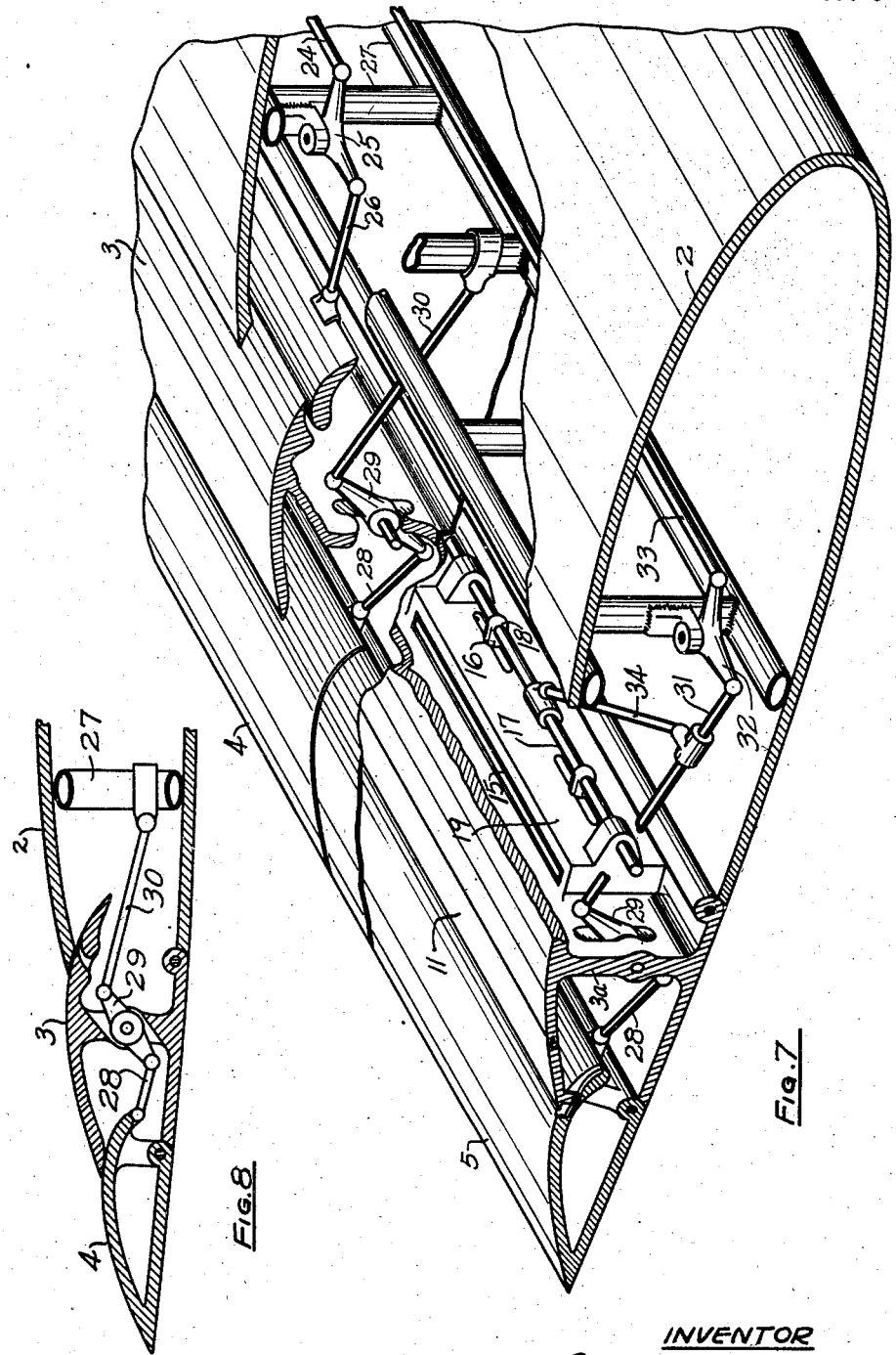

Patented Sept. 3, 1946

2,406,923

UNITED STATES PATENT OFFICE 2,406,923

AIRCRAFT HAVING BOUNDARY LAYER CONTROLLED WINGS

Edward A. Stalker, Bay City, Mich.

Application May 14, 1943, Serial No. 486,953

16 Claims. (Cl. 244—42)

My invention relates to aircraft and more particularly to boundary layer controlled wings and to the means of obtaining lateral control moments therewith.

It is the principal object of the invention to provide an aircraft having a wing and control flaps which may be depressed to give a high-lift configuration to the wing and in which with the flaps in such high lift position a control force is developed and applied to produce a desired rolling moment.

It is also an object to provide a wing incorporating effective boundary layer control for use with such an aircraft where the control force is developed through the use of a jet discharge.

It is a further object to provide a wing of this character in which a favorable yawing moment is developed in the high-lift position of the flaps.

It is a still further object to provide a wing having lift flaps and ailerons in which the flaps and ailerons may be easily and readily controlled coincidentally and in addition the ailerons operated separately as desired for establishing the proper control of the aircraft.

Other objects and advantages will appear from the following description, the accompanying drawings, and the appended claims.

Referring to the drawings, which disclose a preferred embodiment of the invention:

Fig. 7 is a fragmentary enlarged perspective view of the flap actuating mechanism;

Fig. 8 is a fragmentary section along the line 8—8 of Fig. 6;

Figure 2:
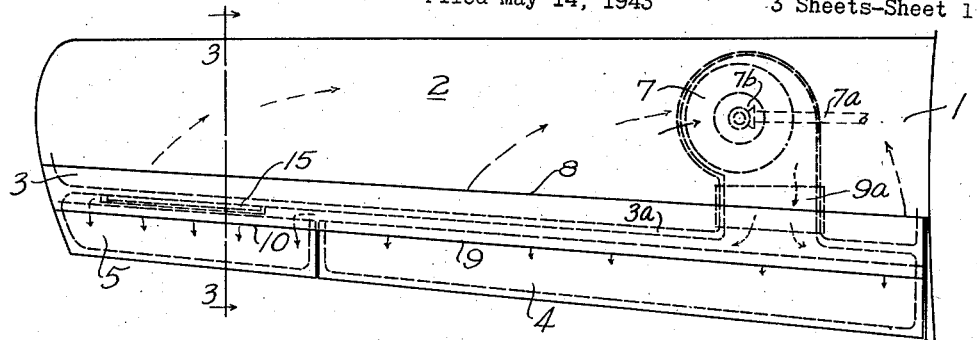
Fig. 2 is an enlarged view of one of the wings.

In the drawings, the wings are shown at 1, each having a main body 2 and intermediate lift flap 3 and a rear flap set comprising a rear lift flap 4 and an aileron 5. The intermediate and rear flaps are pivotally attached to each other and to the trailing end of the main body in the tandem arrangement as shown. These flaps are adapted to be connected for actuation by the pilot in the usual manner, with corresponding flaps on the opposite wings being similarly actuated. The aileron or control flaps 5 are located outwardly of the lift flaps 4 and are arranged for actuation by the pilot with corresponding flaps on the opposite wings being actuated inversely with respect to each other.

Figure 3:
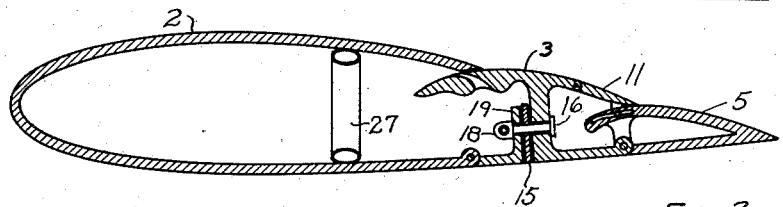
Fig. 3 is a section along the line 3—3 of Fig. 2.
Figure 4:
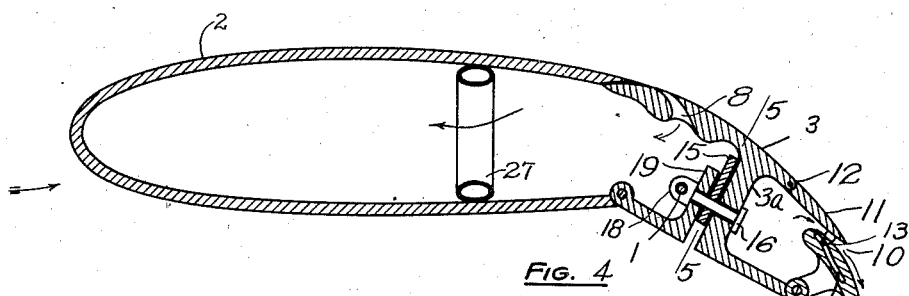
Fig. 4 is a section similar to that of Fig. 3 but with the flaps down.
Figure 1:
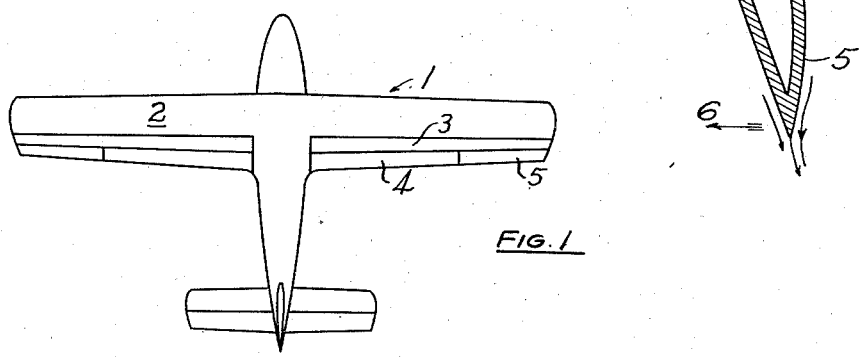
Fig. 1 is a plan view of an airplane having wings constructed in accordance with the present invention.

The flaps are shown in the raised position in Fig. 3 and in the high lift position in Fig. 4. In the latter position the wind is being deflected from the horizontal direction to the vertical direction and the lift coefficient of the wing is increased toward a high or maximum value. With the flap in this position, a forward movement of the aileron as indicated by the arrow 6 will not of itself produce an effective increase of lift coefficient and hence it is not practicable to obtain a rolling moment by such an operation.

It is, however, very desirable that it be possible to raise and control the position of the wing tips even in the fully depressed position of the flaps. This can be done by the emission of a jet from the wing interior under the proper control of the mass of the jet discharge, giving a mass reaction force from the jet mass. This force is independent of any lift on the wing arising from the relative wind.

Flap section 3 is formed with a slot 8 which is located in the forward part thereof and in such position that with the flap raised, the slot is closed by the trailing end of the main body 2 and thus is rendered ineffective. However, when the flap is depressed a substantial extent, the slot is uncovered and provides a path leading into the wing interior through which the boundary layer on the wing surface in advance of the slot may be inducted. The blower 7 inducts air through the suction slot 8 by way of the interior of the main body of the wing along the path indicated by the arrows. The blower is power driven by the shaft 7a and gear train 7b. The air is discharged from the blower through the duct 9a which is flexible to accommodate the rotation of the flap 3, and into the space to the rear of wall 3a which seals the suction slot from the space carrying the blowing slot air. The air is discharged from the wing through the discharge slots 9 and 10, the former along the lift flap 4 and the latter along the control flap or aileron 5. The slots are so formed that with the flaps fully depressed, the jet is discharged downward at a substantial angle to the wing main body, preferably substantially as a right angle. The suction slot 8 is thus located in position to induct the boundary layer on the leading portion of the wing surface to thereby cause the main flow to follow the wing surface to the discharge slot, and is followed by the discharge slots 9 and 10 located rearwardly thereof and adapted to provide for a controlled jet discharge in a downward direction. Flap 3 has an auxiliary flap section 11 hinged at the trailing end thereof and slots 9 and 10 are located between the flap sections 11 and 4, and 11 and 5, respectively, and are directed in a rearward direction generally tangent to the surface of the flap.

In Fig. 4 it will be observed that a down movement of the aileron 5 has caused the slot 10 to open wider because the flap 11 hinged at 12 is oscillated by the cam mechanism comprising the lug 13 sliding in the cam slot 14. This cam slot approaches the forward surface of the flaps 4 and 5, respectively, near the extreme down position thereof so that when either of the latter is depressed fully the flap 11 is spaced further outward therefrom, emitting a greater volume of air. This gives a greater mass reaction and hence affords a rolling moment under conditions where addition lift as a result of the position of the flaps is not practicable or feasible.

To be useful in controlling the boundary layer the induction slot should extend along a large portion of the wing area and should have a narrow width preferably about 2 per cent of the chord length or less. Slots or openings of large chordwise extent are not useful for controlling the boundary layer and cause high drag and early breakdown of the streamline flow along the wing surface.

To obtain the maximum lift coefficient for landing, all the lift flaps are fully depressed. The ailerons are preferably depressed within about 5 degrees of the lift flaps. This 5 degrees is used to control the jet because it must be varied if there is to be a change in rolling moment.

In addition to the above controls, it is desirable to increase the drag of the up aileron so as to obtain the proper yawing moment on the wing. The mechanism of Fig. 4 is arranged so that the baffle 15 is displaced downwardly below the lower wing surface when the aileron goes up but is retained within the wing in the neutral position of the aileron as shown in Fig. 3 and for a movement of the aileron below the normal depressed attitude conferred upon it for high-lift purposes, as shown in Fig. 4. The arrangement of the baffle projecting downwardly below the wing in response to a raised aileron is desirable because it is in position to react with air which has not been slowed up by the aileron and further for the reason that its effect is developed without interfering with the proper action of the upper surface slots in obtaining boundary layer control.

Figure 6:
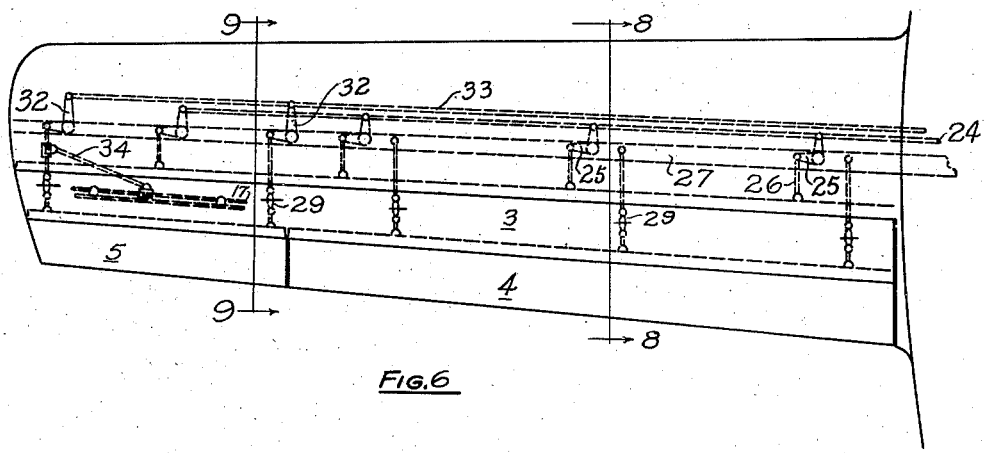
Fig. 6 is a plan view of the wing showing the flap actuating mechanism.
Figure 5:
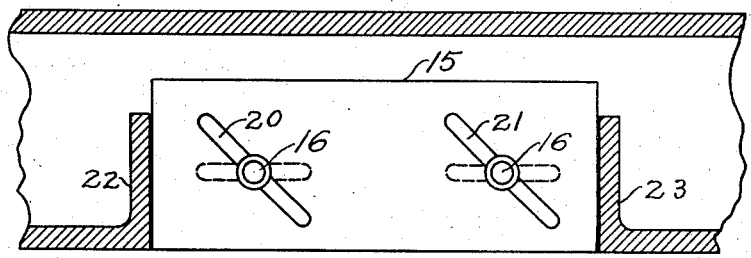
Fig. 5 is a further enlarged fragmentary section along the line 5—5 of Fig. 4.

Referring particularly to Figs. 5 to 7, the baffle 15 rides on the shafts 16 fixed to the push rod 17 at 18. These shafts are free to be slid horizontally in horizontal slots in the flap walls 3a and 19. The shafts also pass through the diagonal slots 20 and 21 in the baffle. Since the baffle is restrained from endwise motion by the walls 22 and 23, a movement horizontally of the shafts will cause the baffle to be displaced vertically.

The mechanism to move the flaps and ailerons is shown in Figs. 6 to 9. The rod 24 is displaceable spanwise to rotate the bell cranks 25 which are articulated to them and the intermediate flap 3 by the links 26. As shown in Fig. 8 the last flap 4 is connected to the spar 27 through the link 28, rocker arm 29, and link 30. It will now be clear that a movement of link 26 rearward will move flaps 3 and 4 downward.

The same type of mechanism is employed to move the flaps at the tip of the wing. To obtain aileron control after the flaps are depressed the inner end of such rods as 30, namely rods 31 are attached to bell cranks 32 so that the rocker arms 29 may be oscillated. Thus the intermediate flap 3 and the aileron 5 can be displaced downward to the high-lift position and then the aileron can be oscillated to either side of the high-lift position. The rod 33 runs from the bell cranks 32 to the pilot's control. The link 31 is articulated to the push rod 17 by the link 34 to coordinate the movement of the aileron 5 and baffle 15. When the aileron goes up above neutral the baffle protrudes from the wing but at other positions of the aileron, it remains within the wing interior.

It is important that the blowing or discharge slot be preceded by a suction slot located in the rear half of the wing preferably at the junction of the first flap and slot. This suction slot will prevent burbling of the flow over the nose and forward half of the wing and make the main flow reach the rearwardly directed aileron jet. It will also eliminate the need for a discharge slot in the forward portion of the wing. The aileron jet then serves the dual purpose of preserving the lift at relatively large flap angles as shown in Fig. 4, for example, and affording a control of the rolling moment through variation in the jet volume. Since this jet is directed downward substantially perpendicular to the main wing body (and the relative wind) it produces the desired rolling moment but can give no forward thrust. Hence the yawing moment will be wrong for the turn induced by the rolling moment. The improper yawing moment is corrected by the baffle mechanism which develops a yawing moment in the proper direction, and to a variable degree corresponding to the extent of displacement of the aileron 5 above its neutral position.

With further reference to the discharge slots, it is to be noted that a discharge slot is not desirable in the wing nose when the airplane is to travel at high speed with the flaps up, because the jet upon emission passes along a large extent of wing area. To insure an even distribution of jet velocity along the slot and to insure that at no point along the slot is the jet of a lower velocity than the local relative wind, it is necessary that the jet have some excess velocity over the local relative wind. This additional velocity means directly added drag because of the greater rubbing speed on the wing surface. This practical difficulty appears not to have been heretofore recognized. It apparently has not been recognized either, that if the suction slots are properly located, a blowing slot in the forward half of the wing will not improve the maximum lift realizable from the wing.

On the other hand a discharge slot, aft of a properly located suction slot and in the rear small fraction of the wing, will rub on a small area and, what is more important, do this where the relative flow is actually more turbulent than the flow composing the jet so that the drag is not significantly increased by the jet, if increased at all. It is, however, difficult to get the discharge flow past the suction slot or slots to the discharge slot especially where flaps are used.

Figure 11:
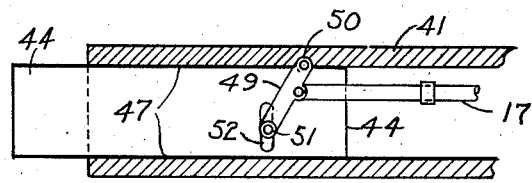
Fig. 11 is a sectional view through the wing on the line 11—11 of Fig. 10.
Figure 9:
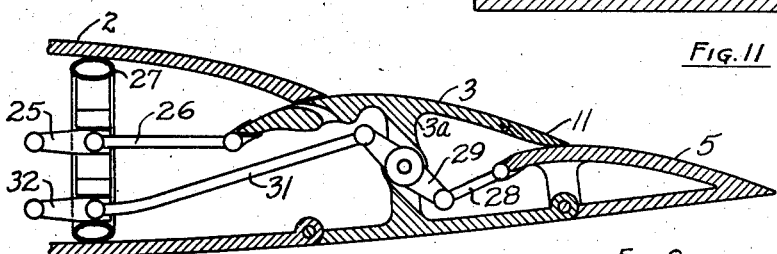
Fig. 9 is a fragmentary section along line 9—9 of Fig. 6.
Figure 10:
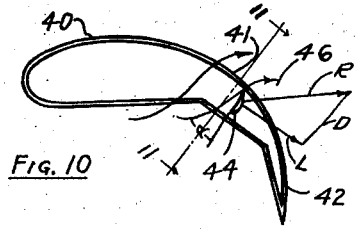
Fig. 10 is a view in end elevation of a wing having a modified form of construction.

A modified form of the invention is shown in Figs. 10 and 11 incorporating a control for developing a favorable yawing moment in the high-lift position of the flaps. As shown the wing has the main body 40, and the lift flap 41 and aileron 42 arranged in tandem rearwardly thereof and adapted to be depressed to provide a highly cambered wing contour. The baffle or vane 44 is telescoped within the wing, preferably within the flap portion 41, and is arranged to be projected in a spanwise direction out the tip of the wing where it will be in the high velocity flow arising from the great difference in pressure between the upper and lower surfaces of the wing. For instance with a lift coefficient of 5.0 such as is obtainable with such highly cambered wings, the velocity upward across the tip of the wing is substantially greater than and approximately 2.23 times the velocity of flight. The force on a vane normal to the flow is thus also substantially increased and becomes of the order of 5 or more times as great as the force of the main relative wind. However by giving the vane 44 an airfoil shape and properly aligning it relative to the local wind the force available for yawing can be made even larger.

The vane 44 is shown in Fig. 10 with an airfoil cross section. By placing the chord of the vane about normal to the chord of the intermediate flap, the tip flow makes the angle $\alpha$ with the vane. This gives rise to the lift force L perpendicular to the velocity vector 46 and the drag force D parallel to said vector. Then the resultant R lies substantially along the yawing direction and constitutes a very powerful yawing force.

The vane 44 is projected from the well 47 which now opens tipward by the rod 48 and lever 49 hinged at 50. The lower end of lever 49 has a pin 51 which slides in the slot 52 to accommodate the vertical movement of the pin. Suitable connection is made from the rod 48 to the pilot's control mechanism for actuation of the baffles either independently of the flaps or in coordinated relation therewith as described above.

Cross reference is made to my copending application Serial No. 353,712, filed August 22, 1940, which discloses the use of a jet discharge for developing a favorable yawing moment in the lowered position of the control flaps.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in an aircraft, a supporting wing, an aileron on the wing, means for depressing said aileron to a position where the rear portion thereof is substantially normal to the forward portion of the wing, a blower housed within the aircraft, said wing having a narrow spanwise slot in its upper surface in communication with the inlet of said blower for the induction of boundary layer air providing for augmenting the lift of the wing, said wing having a narrow spanwise discharge slot in its upper surface in communication with the discharge of said blower for discharge of a jet therefrom, said induction slot being located ahead of said discharge slot to cause the main flow to follow the wing surface to the discharge jet, the walls of said discharge slot being formed to direct the discharge jet downstream substantially along said rear portion of the depressed aileron surface to provide a jet having a substantial component perpendicular to the front portion of the wing thereby providing a rolling moment, and means to control the volume of said discharge slot flow to control said rolling moment.

2. In combination in an aircraft, hollow wings each having a discharge slot and an induction slot located ahead of the discharge slot to cause the main flow to follow the wing surface to the discharge slot in the same side surface of the wing in communication with the wing interior, said wing having a movable trailing edge flap, ailerons at the outer ends of the wings adapted to be depressed to a position where the rear portion thereof is substantially normal to the forward portion of the wing, a power driven blower within the aircraft in communication with said wing interior to induce an inflow through the induction slot and an outflow jet through the discharge slot, said discharge slot being formed to direct the slot flow downward over said rear portion of the aileron in a direction at a substantial angle to the forward wing surface, and steering means to move the opposite ailerons differentially and to control the discharge slot flows in opposite wings differentially with the force of the jet on the down-aileron wing being increased relative to that on the up-aileron wing.

3. In combination in an aircraft, a wing on each side of the aircraft, each said wing having a flap set comprising a lift flap and an aileron disposed spanwise and rotatable relative to the forepart of said wing to a high lift position, means to rotate said set on each side of the aircraft downward coincidentally to provide a high-lift configuration for each wing section along the spanwise extent of said set, each said wing having a discharge slot in its surface the size of which varies in accordance with the setting of said aileron relative to said lift flap to discharge a flow of fluid downward to provide a mass reaction rolling force, means to supply a fluid flow to said slot, and aileron control means to move said ailerons differentially with respect to said lift flaps and while the latter remain in a predetermined adjusted position and to control the quantity of discharge from said slots differentially.

4. In combination in an aircraft, a hollow wing on each side of the aircraft, each said wing having a flap set comprising a lift flap and an aileron disposed spanwise and rotatable relative to the forepart of said wing and relative to said lift flap, means to rotate said set on each side of the aircraft downward coincidentally to provide a high-lift attitude for each wing along the spanwise extent of said set, a blower within the aircraft, each said wing having an induction slot in its upper surface in communication with the inlet of said blower and a discharge slot located in the surface aft thereof in communication with the discharge of said blower to discharge a flow of fluid downward to provide a mass reaction rolling force, the flow through said discharge slot being progressively increased as said aileron is lowered relative to said lift flap, and means operable while said set is in said high-lift attitude to move said ailerons differentially and to control the quantity of discharge from said discharge slots differentially.

5. In combination in an aircraft, a supporting wing, said wing having an adjustably controlled surface, means to adjust said control surface relative to the forward part of the wing, a baffle element received interiorly within said wing, and means to move said control surface and said baffle element differentially so that as said control surface moves upwardly said baffle is projected beyond the wing surface into the relative wind to cause a yawing drag force.

6. The combination of claim 5 in which said baffle is projected beyond the lower surface of said wing.

7. The combination of claim 5 in which said baffle is projected spanwise beyond the tip of said wing.

8. In combination in an aircraft, a wing on each side of the aircraft, each said wing having a flap set comprising a lift flap and an aileron disposed spanwise and rotatable relative to the forepart of said wing, means to rotate said set on each side of the aircraft downward coincidentally to provide a high-lift configuration for each wing section along the spanwise extent of said set, each said wing having a discharge slot in its surface to discharge a flow of fluid downward to provide a mass reaction rolling force, said aileron being arranged to cause increased slot opening and increased flow therethrough when depressed, means to supply a fluid flow to said slot, aileron control means to move said ailerons differentially from said high-lift configuration and to control the quantity of discharge from said slots differentially, a baffle recessed in said wing adapted for projection into the relative wind, and means operably connected to said aileron control to project said baffle into the relative wind on the wing with the up-aileron coincidentally with the differential movement of said ailerons.

9. In combination in an aircraft, a wing on each side of the aircraft, each said wing having a flap set comprising a lift flap and an aileron disposed spanwise and rotated relative to the forepart of the wing to form a highly cambered wing along the spanwise extent of said set, each said wing having a discharge slot in its surface to discharge a flow of fluid downward to provide a mass reaction rolling force, means to supply a fluid flow to said slot, aileron control means to move said ailerons differentially from said high-lift configuration and to control the quantity of discharge from said slots differentially, a baffle recessed in said wing adapted for projection into the relative wind, means operably connected to said aileron control to project said baffle into the relative wind on the wing with the up-aileron coincidentally with the differential movement of said ailerons, and means to move both ailerons to the low camber position and retain both said baffles in the retracted position.

10. In combination in an aircraft, a wing on each side of the aircraft, each said wing having an intermediate flap and a rear flap set comprising a rear lift flap and an aileron, said rear flap set being disposed spanwise along said intermediate flap and supported for rotation relative thereto, means to move said intermediate flap downward on each side of the aircraft coincidentally with the movement downward of said set to provide a highly cambered high-lift configuration for each wing, said intermediate flap and said aileron forming therebetween a discharge slot for directing a flow out of the wing rearward along the aileron surface, means to supply a flow to said slot, and means to move one of said ailerons downward from substantially said high-lift configuration of said wing while coincidentally moving the opposite aileron upward, said downward aileron being adapted to cooperate with said intermediate flap to expand said discharge slot to provide a mass reaction force from the discharge jet to roll the wing.

11. In combination in an aircraft, opposite wings each having an inlet slot in the rear half of the wing leading into the wing interior, power driven blower means within the aircraft in communication with said inlet slot of each wing for the induction of the boundary layer on said wing surface, each said wing having an aileron and a discharge slot adjacent the aileron, said discharge slots having communication with the discharge of said blower means and being directed in a downward direction in the depressed position of said aileron, means to control the jet volume of discharged fluid from said slots differentially with respect to the slots of opposite wings, means to control said ailerons differentially and in coordinated relation with said jet volumes with the larger volume of discharge of jet fluid at the down aileron, said blower means and slots creating a rolling moment by increasing the lift coefficient of the wing by boundary layer control and providing a mass reaction force from the jet from said discharge slots.

12. In combination in an aircraft, opposite wings each having a control surface capable of being depressed to a high lift position, means forming a discharge slot in each of said control surfaces communicating with the wing interior, a blower having its discharge in communication with said discharge slot to direct a flow therethrough out of said wing, said discharge slot having a narrow width to provide a low wing drag, said slot forming means being formed to direct the slot jet downward relative to the forward portion of said wing in said high lift position, and means on the discharge side of said blower to control the volume of the said slot jets differentially with respect to the slots of opposite wings and while said control surfaces remain in said high lift position to provide a controlled mass reaction rolling force acting on the airplane.

13. In combination in an aircraft a hollow wing on each side thereof, each said wing having a plurality of compartments substantially sealed from each other within the wing, each said wing having means forming a boundary layer control slot in its upper surface in communication with a said compartment, each said wing having means forming a discharge slot communicating with another said compartment, a blower within the aircraft in communication with said compartments to induce flows through the respective said slots, the jet flows through said discharge slots being directed out of the wing interior and downward at a substantial angle relative to the forward portion of said wing to create a rolling moment, and means to control the volume of the slot jets differentially with respect to the slots of opposite wings to provide a controlled rolling moment by increasing the lift coefficient of the wing by boundary layer control and a mass reaction force from the jet from a said discharge slot.

14. In combination in an aircraft a hollow wing on each side thereof, each said wing having a plurality of compartments substantially sealed from each other within the wing, each said wing having means forming a boundary layer control slot in its upper surface in communication with one of said compartments, each said wing having means forming a discharge slot communicating with another said compartment, blower means within the aircraft having its discharge in communication with said other compartment to direct flows of fluid out of the wing through said discharge slots, each said discharge slot having a wall formed to direct the discharge jet more downward than parallel to the forward portion of said wing, each said discharge slot lying aft of said boundary layer control slot, and means to control the jets from said discharge slots in each said wing differentially with respect to opposite wings to provide a controlled rolling moment acting on the wing.

15. In combination in an aircraft, a hollow wing on each side of the aircraft, a control surface on said wing which is adapted to be depressed to a high lift position, means forming an induction slot leading into the wing interior, power actuated blower means within the aircraft in communication with said wing slots to induce a flow into said wing to augment the lift thereof, means forming a discharge slot in each said wing in communication with the discharge side of said blower means and located adjacent the control surface thereof, each said discharge slot being located rearwardly of said induction slot and having slot walls for discharging in a downward direction over said control surface substantially normal to the forward portion of the wing, and means to control the volume of flow through slots in opposite wings to provide a controlled rolling moment.

16. In combination in an aircraft, a supporting wing therefor, said wing having a slot in its upper surface, means to cause a flow through said slot, a baffle element adapted to be moved from an inoperative to an operative position where it extends beyond the normal wing surface into the relative wind to cause a yawing drag force, and means to control the flow through said slot and said movement of said baffle element in coordinated relationship with each other.

EDWARD A. STALKER.